United States Patent Office 2,812,008
Patented Nov. 5, 1957

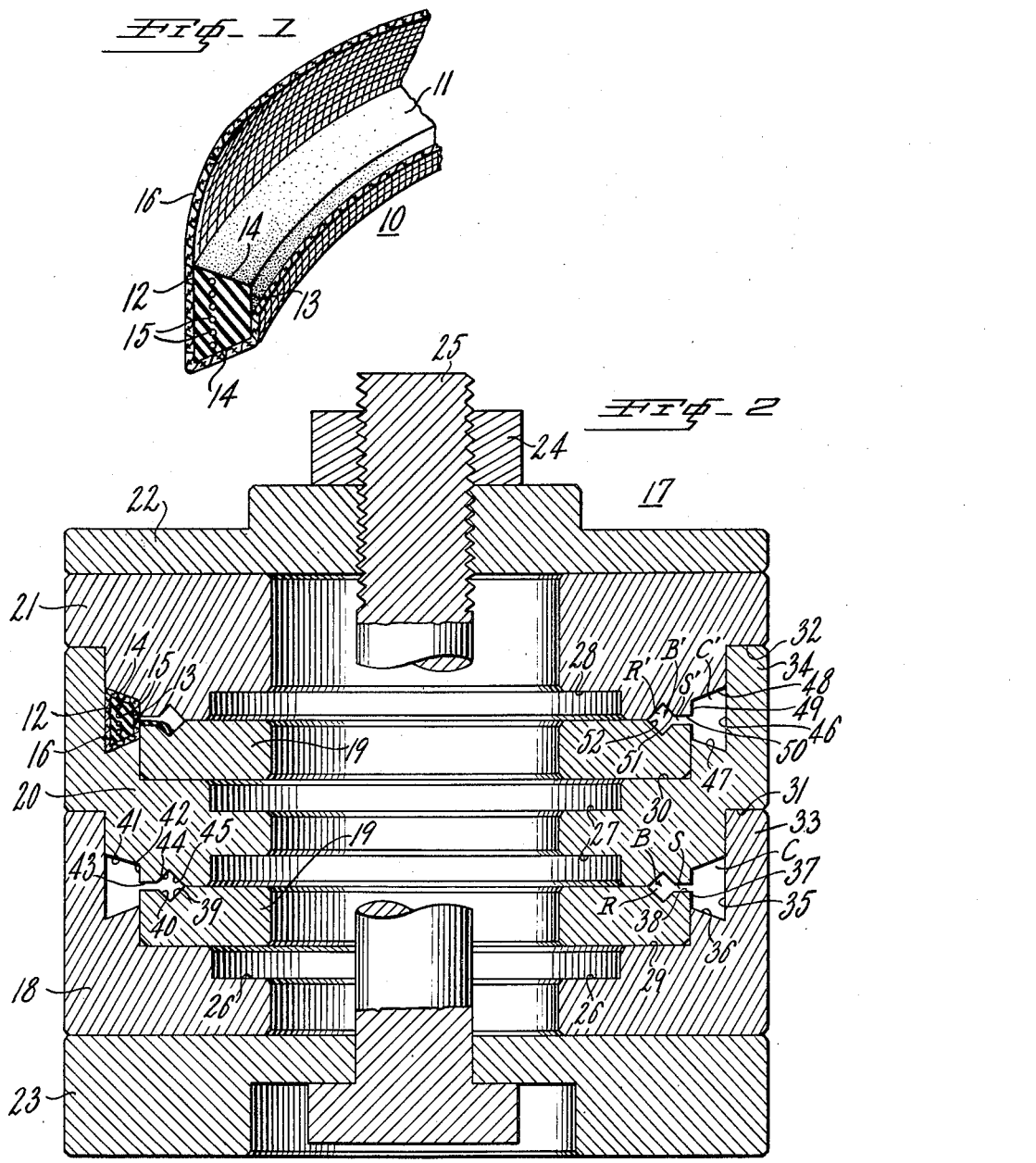

2,812,008

MANUFACTURE OF V-BELTS

Walter T. Bright, Delanco, N. J., assignor to United States Rubber Company, New York, N. Y., a corporation of New Jersey Application March 26, 1956, Serial No. 573,696

6 Claims. (Cl. 154—3)

This invention relates to the manufacture of endless transmission belts and more particularly to an improved method and apparatus for making V-belts wherein the belts are fully molded to the desired volume and the tension cords in said belts are maintained in substantial axial alignment.

In practice, it is practically impossible to control the volume of an uncured belt so that it will exactly coincide with the volume of the mold cavity. Accordingly, in order to produce a fully molded product the uncured belt volume is usually made slightly greater than that of the mold cavity. However, this produces belts which are oversize and have inconsistencies in width and thickness, and invariably causes substantial distortion in the layer or layers of tension cords within the belt body. These undesirable results occur because no proper provision is made in the mold for the escape of excess belt material during molding nor in the belt itself when jacketed. As a consequence, such belts do not seat properly in their driving pulleys; an undue concentration of stress is placed upon the distorted tension cords; such belts slip, vibrate excessively, wear rapidly, and the overstretched tension cords fail within a relatively short period of time.

Therefore the primary objects of this invention are to produce a V-belt which is fully molded to the correct size, shape and volume, to produce a V-belt which is long wearing and substantially free from vibration because the tension cords thereof are maintained in substantial axial alignment during molding, and to provide an improved method and apparatus for making such a belt wherein proper provision is made for the escape of excess belt material not only during molding but also in constructing the belt itself, when jacketed.

Other objects and advantages of the invention will become apparent upon consideration of the following specification and claims when read in conjunction with the accompanying drawing wherein:

Fig. 1 illustrates a portion of a V-belt being provided with a jacket in accordance with the teachings of the invention, and Fig. 2 is a sectional view illustrating a molding apparatus embodying the principles of the invention, including a means properly providing for the escape of the excess belt material during molding.

Referring to Fig. 1 of the drawing, the V-belt 10 comprises an annular body of rubber or like moldable material 11 which is substantially trapezoidal in cross-section. The wide outer periphery 12 is connected to the narrow inner periphery 13 by side walls 14 converging radially inwardly from the outer periphery 12 to the inner periphery 13. The belt body 11 is provided with at least one layer of substantially axially aligned tension cords 15 embedded therein between and substantially parallel to its outer periphery 12 and inner periphery 13. Surrounding body 11 is a jacket 16 of woven fibrous material such as cotton, the ends of the jacket 16 abutting each other midway along the inner periphery 13 of body 11.

Referring now to Fig. 2, the molding apparatus 17 comprises an assembly of the following axially stacked, annular mold members; a female end plate 18, two spacer rings 19, an intermediate ring 20 and male end plate 21. These annular mold members are held in assembled relationship between upper clamp plate 22 and lower clamp plate 23 by a nut 24 and a bolt 25.

The female end plate 18, intermediate ring 20, and male end plate 21 are notched out along their inner peripheries at 26, 27 and 28 respectively; the female end plate 18 and intermediate ring 20 are recessed at 29 and 30 respectively for the reception of spacer rings 19 and the intermediate ring 20 and male end plate 21 are recessed along their outer peripheries at 31 and 32 respectively for the reception of projection 33 of female end plate 18 and projection 34 of intermediate ring 20, respectively. This construction greatly facilitates the assembly and disassembly of the foregoing annular mold members and serves as a means for maintaining these members in axial alignment.

Each of the foregoing annular mold members are also provided with surfaces forming the annular, belt-receiving cavities C, C' and the annular bleeding ports B, B'. As will be apparent, the cavities C, C' are substantially trapezoidal in cross-section, the wide outer peripheries thereof being connected by sidewalls converging radially inwardly to the narrow inner peripheries thereof. The annular bleeding ports B, B' which extend substantially radially inwardly from substantially the center of the inner periphery of cavities C, C' comprise narrow, annular sprues S, S' merging into larger reservoirs R, R' which are substantially diamond-shaped in cross-section. The purpose of the bleeding ports B, B' is to receive any excess material from the belt body 11 during molding, as will be explained more fully below.

The upper portion of female end plate 18 is provided with surfaces 35 and 36 which form the outer periphery and one of the sidewalls respectively of cavity C; the upper portions of the outer peripheries 37 of the spacer rings 19 form part of the inner peripheries of cavities C, C', the outer portions of the top surfaces 38 of rings 19 form part of the sprues S, S' while the V-groove surfaces 39 and 40 therein form part of the reservoirs R, R' of bleeding ports B, B'. The formation of the cavity C is completed by the lower portion of the intermediate ring 20, which is provided with surface 41 forming the other sidewall of the cavity, surface 42 forming the other part of the inner periphery of the cavity, surface 43 forming the other part of the sprue S, and V-groove surfaces 44 and 45, which form the other part of reservoir R of bleeding port B. The cavity C' and bleeding port B' are formed in the same manner as cavity C and bleeding port B; the surfaces 46 and 47 in the upper portion of intermediate ring 20 corresponding to surfaces 35, 36 in female end plate 18, and the surfaces 48, 49, 50, 51 and 52 in the lower portion of male end plate 21, corresponding to surfaces 41, 42, 43, 44 and 45 in the lower portion of the intermediate ring 20; the surfaces on the spacer rings 19 being the same, as noted above.

The aforementioned cavity and sprue forming surfaces, together with the particular nesting arrangement of the foregoing annular mold members is especially advantageous in assembling the molding apparatus 17 and inserting the uncured belts 10, as well as in disassembling the molding apparatus and removing the cured belts therefrom, as will be brought out in more detail below.

While the molding apparatus 17 illustrated is set up to mold two belts, it will be apparent that any desired number of belts may be simultaneously molded by simply using the desired number of intermediate rings 20 and spacer rings 19. On the other hand, if only one belt is to be molded, this can be easily done by removing one of the spacer rings 19 and the intermediate ring 20. Thus, the apparatus 17 has the further advantage of being readily adapted for the molding of substantially any desired number of belts, by virtue of the particular construction of the foregoing annular mold members.

In practicing the invention, reference being had once again to Fig. 1, the typical belt body 11 is formed with the embedded layer of substantially axially aligned tension cords 15 in a conventional manner, the body 11 being slightly oversize to insure full molding thereof. Preferably, the body 11 is provided with a jacket 16, which however, requires a departure from conventional construction. Instead of lapping the ends of the jacket 16 around the inner periphery of the body 11, they are butt-joined midway along the inner periphery of the body, for a purpose to be described below.

The next step is to insert the uncured belt 10 into the molding apparatus 17 and to simultaneously assemble the various annular mold members. This is accomplished by placing a spacer ring 19 on the female end plate 18 and then inserting the belt 10 within the partially formed cavity C. Next, the intermediate ring 20 is positioned on ring 19 and plate 18 to complete the formation of the cavity and to enclose the belt 10. Another spacer ring 19 is placed on the upper portion of intermediate ring 20 and another belt 10 located in the partially completed cavity C', the belt being enclosed by the male end plate 21 completing the cavity. As stated previously, substantially any desired number of belts may be molded by the use of additional spacer rings 19 and intermediate rings 20. Upon completion of the assembly of the annular mold members, they are clamped together between plates 22 and 23 by the nut 24 and bolt 25.

The molding apparatus 17 containing the uncured belts 10 is then placed in an autoclave (not shown). Steam at approximately 90 pounds per square inch pressure is admitted to the autoclave around the molding apparatus 17 to complete the molding operation. The temperature of the steam is sufficient to cure the belts 10 while the simultaneously applied axial pressure thereof on the top and/or bottom of the molding apparatus 17 is great enough to force each of the annular mold members into intimate mating engagement. As this occurs, any excess material in the belt body 11 will be forced out between the butted ends of jacket 16 through the sprues S, S' and into the reservoirs R, R' of bleeding ports B, B'. After a sufficient amount of time has elapsed, the annular mold members are disassembled and the cured belts removed therefrom, the excess material appearing as flash which may be readily trimmed off.

It will be noted from Fig. 2, that the sprues S, S' of bleeding ports B, B' extend from the mid point or center of the inner peripheries of cavities C, C'. There is a two-fold reason for this; first, the butted ends of the belt jacket 16 and the sprues S, S' are in alignment to facilitate passage of the excess material from the body 11 between the butted ends of the jacket and into the bleeding ports B, B'. Secondly, by having the ends of the jacket 16 abut each other along substantially the center of the inner periphery of the belt body 11 and by locating the sprues S of bleeding ports B similarly with respect to the inner periphery of cavities C, C', the flow of the excess material from the body 11 is equalized so that the belts 10 mate intimately with the sidewalls and outer peripheries of the cavities. This insures that the belts will be fully molded with uniformly shaped and smooth sidewalls and outer periphery, thereby producing a belt of the correct size and shape.

Moreover, the aforementioned features combined with the feature of having the excess material escape from the narrow, inner periphery of the belt body 11 rather than from the wide, outer periphery thereof, substantially eliminate any distortion of the layer of tension cords 15 due to movement of the surrounding moldable material by taking full advantage of the radial components of the compressive forces exerted by the side walls 36, 41 and 47, 48 which oppose any tendency of the cords 15 to "follow" the excess material of body 14 toward bleeding ports, B, B'. Thus, the tension cords 15 are maintained in substantial alignment during the molding operation. This is especially important, because if there is any substantial distortion of the layer of tension cords 15, those cords which lie furthest away from the center of rotation of the belt around its pulley will be the only ones carrying the load. As will be evident, with such a concentration of tensile stress, these outermost cords will fail much more rapidly than if all of the cords were substantially equally distant from the center of rotation, as the tensile stress would then be evenly distributed among all of the cords. Likewise, distortion of the tension cords 15 would also induce undue vibration and undesirable slippage of the belt during operation.

From the foregoing detailed description, it will now be apparent that by following the teachings of the invention, a substantially improved product is produced. More specifically, such a V-belt will not only be fully molded to the correct size, shape and volume but also will be long wearing because it is substantially free from tension cord distortion and vibration, since the tension cords thereof have been maintained in substantial alignment by making suitable and proper provision for the escape of the excess belt body material. Moreover, by abutting the ends of the belt jacket along the inner periphery thereof, flexibility of the belt is substantially improved over one having the conventional lapped jacket construction.

While only certain embodiments of the invention have been shown and described it is to be understood that various changes may be made therein by those skilled in the art without exceeding the scope of the invention as defined in the appended claims. For example, the invention would be equally applicable to belts which are molded inside out, i. e., with their outer peripheries facing radially inwardly. In such a case, the excess belt material would be permitted to escape radially outwardly from the narrow peripheries of the belts, which peripheries would be outermost during molding. Likewise, while steam is preferred as a means of applying heat and pressure to cure the belts, it is equally practical to use hot air and mechanically applied pressure on the top and/or bottom of the molding apparatus for this purpose.

Having thus described my invention, what I claim and desire to protect by Letters Patent is:

1. Apparatus for making a V-belt comprising an annular body of moldable material, such as rubber, having a wide periphery and a narrow periphery connected by sidewalls converging radially from said wide periphery to said narrow periphery, and at least one layer of substantially axially aligned tension cords embedded in said body, said apparatus comprising an assembly of axially stacked, annular mold members having surfaces forming an annular, belt-receiving cavity having a wide periphery and a narrow periphery connected by sidewalls converging radially from the wide periphery of said cavity to the narrow periphery thereof, and an annular bleeding port extending substantially radially from the narrow periphery of said cavity for receiving any excess material from said body during molding, while maintaining axial alignment of said tension cords.

2. Apparatus as in claim 1 wherein one of said annular mold members has surfaces forming a sidewall and part of the narrow periphery of said cavity as well as part of said bleeding port, and another of said annular mold members has a surface forming the wide periphery of said cavity.

3. Apparatus for making a V-belt comprising an annular body of moldable material, such as rubber, having an outer periphery and an inner periphery connected by sidewalls converging radially inwardly from said outer periphery to said inner periphery, at least one layer of substantially axially aligned tension cords embedded in said body, and a fibrous jacket wrapped around said body with the ends of said jacket substantially abutting each other along a peripheral line located substantially at the center of said inner periphery, said apparatus comprising an assembly of axially stacked, annular mold members having surfaces forming an annular cavity having an outer periphery and an inner periphery connected by sidewalls converging radially inwardly from the outer periphery of said cavity to the inner periphery thereof and an annular bleeding port extending substantially radially inwardly from substantially the center of the inner periphery of said cavity for receiving any excess material passing from said body between the ends of said jacket during molding, while maintaining axial alignment of said tension cords.

4. Apparatus as in claim 3 wherein one of said annular mold members has surfaces forming a sidewall and part of the inner periphery of said cavity as well as part of said bleeding port, another of said annular mold members has surfaces forming the outer periphery and the other sidewall of said cavity, and still another of said annular mold members has surfaces forming the other part of the inner periphery of said cavity and the other part of said bleeding port.

5. A method of making a V-belt comprising an annular body of moldable material, such as rubber, having a wide periphery and a narrow periphery connected by sidewalls converging radially from said wide periphery to said narrow periphery, and at least one layer of substantially axially aligned tension cords embedded in said body, said method comprising forming an assembly of axially stacked, annular mold members having surfaces forming an annular, belt-receiving cavity having a wide periphery and a narrow periphery connected by sidewalls converging radially from the wide periphery of said cavity to the narrow periphery thereof and an annular bleeding port extending substantially radially from the narrow periphery of said cavity, simultaneously inserting said belt into said cavity in such a manner that the narrow periphery of said body lies adjacent said bleeding port, applying heat of sufficient intensity to cure said belt, and applying pressure to said mold members to force any excess material from said body into said bleeding port, while maintaining axial alignment of said tension cords.

6. A method of making a V-belt comprising an annular body of moldable material, such as rubber, having an outer periphery and an inner periphery connected by sidewalls converging radially inwardly from said outer periphery to said inner periphery, and a layer of tension cords embedded in said body, said method comprising wrapping a fibrous jacket around said body so that the ends of said jacket substantially abut each other along a peripheral line located subsstantially at the center of said inner periphery, forming an assembly of axially stacked, annular mold members having surfaces forming an annular, belt-receiving cavity having an outer periphery and an inner periphery connected by sidewalls converging radially inwardly from the outer periphery of said cavity to the inner periphery thereof and an annular bleeding port extending substantially radially inwardly from substantially the center of the inner periphery of said cavity, simultaneously inserting said belt into said cavity in such a manner that the ends of said jacket lie adjacent said bleeding port, applying heat of sufficient intensity to cure said belt, and simultaneously applying axial pressure to said mold members to force any excess material from said body between the ends of said jacket into said bleeding port, while maintaining axial alignment of said tension cords.

References Cited in the file of this patent
UNITED STATES PATENTS

| | | |
|---|---|---|
| 2,611,151 | Carter et al. | Sept. 23, 1952 |
| 2,724,865 | Mills et al. | Nov. 29, 1955 |